Nov. 12, 1968 — L. R. WHITTINGTON — 3,410,299
VALVE FOR INFLATABLE ARTICLE
Filed May 18, 1966 — 2 Sheets-Sheet 1
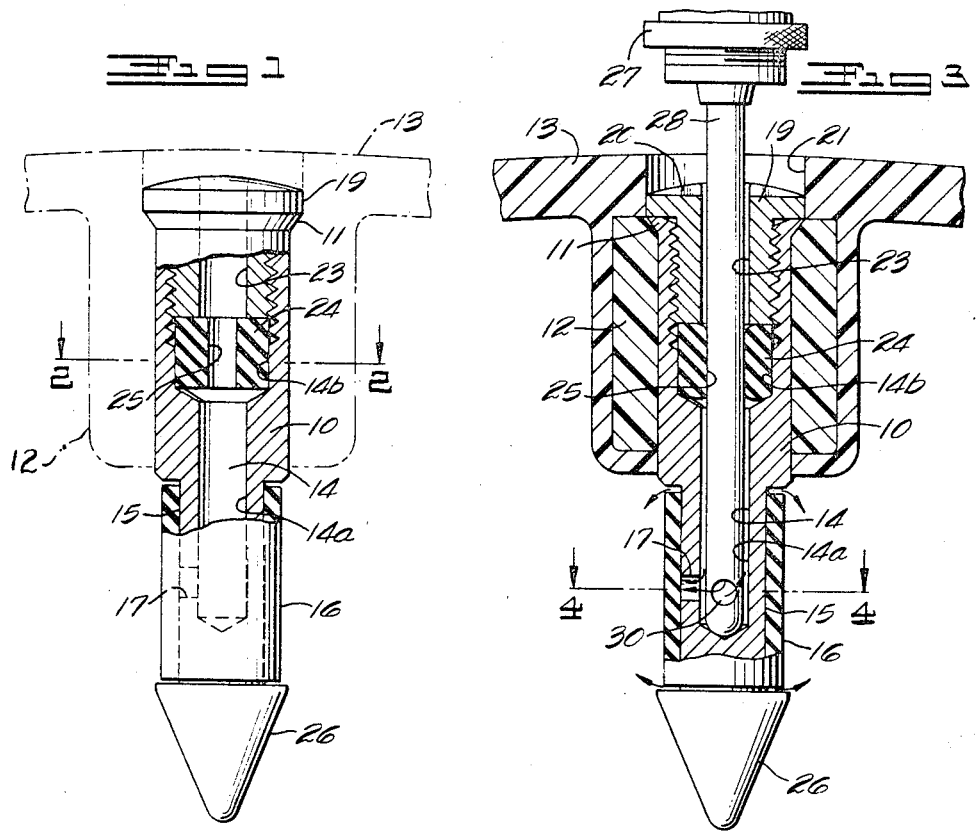
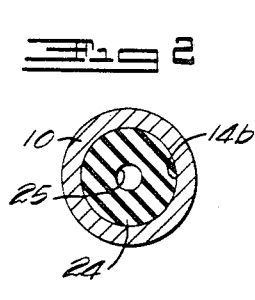
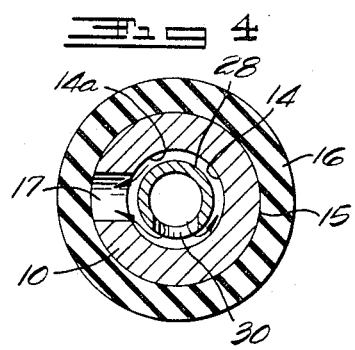
INVENTOR.
LLOYD R. WHITTINGTON
BY William Cleland
ATTORNEY Nov. 12, 1968    L. R. WHITTINGTON    3,410,299
VALVE FOR INFLATABLE ARTICLE
Filed May 18, 1966    2 Sheets-Sheet 2
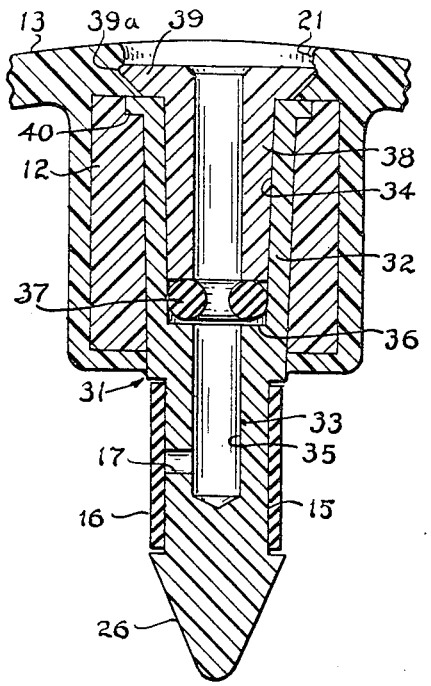
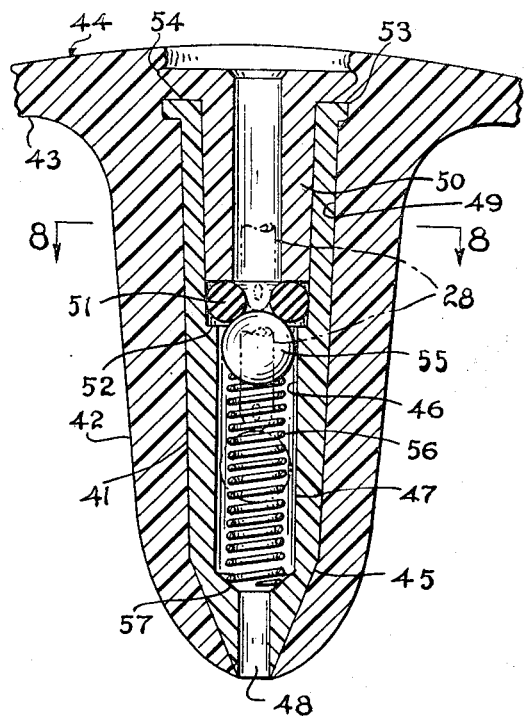
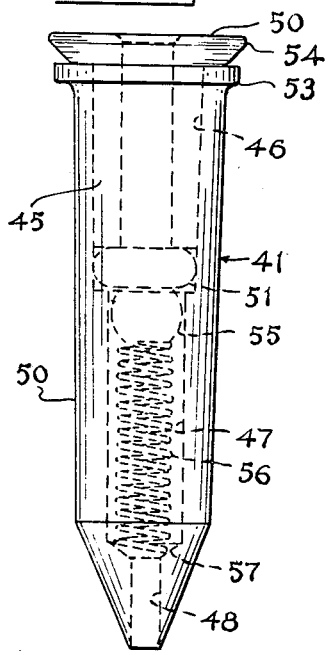
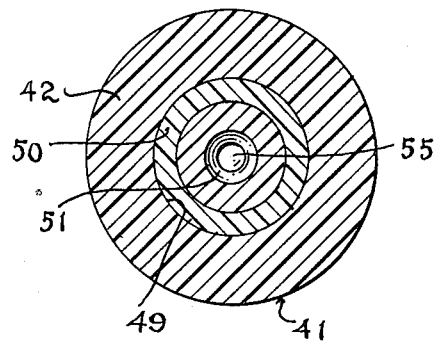
INVENTOR.
Lloyd R. Whittington
BY William Cleland
Attorney

3,410,299
VALVE FOR INFLATABLE ARTICLE
Lloyd R. Whittington, Ashland, Ohio, assignor to The National Latex Products Company, Ashland, Ohio, a corporation of Ohio
Continuation-in-part of application Ser. No. 468,758, July 7, 1965. This application May 18, 1966, Ser. No. 551,020
6 Claims. (Cl. 137—223)

This is a continuation-in-part of Lloyd R. Whittington U.S. patent application Ser. No. 468,758, filed July 7, 1965.

This invention relates to inflatable articles and, in particular, relates to a valve for an inflatable article.

Heretofore, valves have been provided for inflated articles by which an article could be inflated by threaded attachment thereto of a threaded fitting on a hand pump, or on a conduit or tube from a source of pressurized air. Nicholls et al. U.S. Patent 3,100,641 discloses a valve of this general type which has been successfully used in athletic balls, such as basketballs, footballs, volley balls, and the like. The patented valve, however, required use of a specific threaded fitting for threaded attachment to the outer end of the valve stem to connect it with the source of pressurized air. On the other hand, inflation needles so widely and popularly used in the United States and elsewhere could not be satisfactorily used to inflate articles in which said patented valves were incorporated. Adaptors provided for temporary use with such inflation needles were not popular because they were easily misplaced or lost.

Valves which are normally used with the aforesaid inflation needles generally have required provision of an elastomeric body in the wall of the inflatable articles, adapted to be penetrated by the needle, and to be self-sealing upon withdrawal of the needle. It is a known fact, however, that such self-sealing devices have been very unreliable because the articles lost pressure and firmness quite rapidly in service.

One object of the present invention is to provide an inflation valve for inflatable articles, having good air retention properties of the Nicholls et al. type of valve, but in which is incorporated improved inflation means permitting use of well-known inflation needles for quickly and effectively inflating the articles without the aforesaid threaded attachment of the needle to the valve stem.

Another object of the invention is to provide an improved inflation valve, as set forth in the previous object, by which rapid inflation of an article is accomplished without loss of inflation air.

Another object of the invention is to provide an inflation valve unit, for incorporation in an elastic valve housing of an inflatable article at the time of manufacture of the same, the valve unit including improved air-sealing means operable as by injection of a needle-like implement into the valve unit either to inflate or deflate the article, whereby upon completion of certain manufacturing procedures upon the inflated article the same may be deflated to compact size for shipping or storage purposes.

Still another object of the invention is to provide an improved inflation valve of the character described, by which an article alternatively may be inflated by other means if an inflation needle is not available.

Other objects of the invention will be manifest from the following brief description and the accompanying drawings.

Of the accompanying drawings:

FIGURE 1 is a greatly enlarged side elevation, partly broken away and in cross-section, of an improved valve for an inflatable ball, parts of ball being shown in chain-dotted lines.

FIGURE 2 is a horizontal cross-section taken substantially on the line 2—2 of FIGURE 1.

FIGURE 3 is a view corresponding to FIGURE 1, but illustrating the improved valve incorporated in an inflatable athletic ball, and with a known type of inflation needle inserted in the valve for inflation of the ball.

FIGURE 4 is a horizontal cross-section taken substantially on the line 4—4 of FIGURE 3.

FIGURE 5 is a view corresponding to FIGURE 1, illustrating a modified form of valve unit molded in an inflatable ball.

FIGURE 6 is a view corresponding to FIGURE 5, and illustrating still another form of valve unit in an inflatable ball.

FIGURE 7 is a front elevation of the valve unit from FIGURE 6, apart from the ball.

FIGURE 8 is a section taken on the line 8—8 of FIGURE 6.

Referring particularly to FIGURE 1, there is illustrated in full lines, an inflation valve incorporating the features of the invention, including an elongated stem 10 of rigid material, such as metal, an outer end portion of which is flared at 11 for anchoring the same in an elastic housing 12 integral with the wall of a hollow vinyl ball 13, as shown in chain-dotted and full lines in FIGURES 3 and 4, respectively, or as otherwise shown in said prior U.S. Patent 3,100,641.

Within the stem 10 may be a passage 14 which extends inwardly of the outer end to a depth or extent short of the inner end of the stem, said stem being adapted to project freely within the article. The inwardly projecting end of the stem is provided with an annular groove 15 defining a reduced, uniformly smooth cylindrical surface of substantial length, and over which a tubular elastic sleeve 16 is yieldingly expanded to embrace the same and thereby effectively to seal an opening 17 from said cylindrical surface to passage 14 adjacent the inner end thereof against outward passage of inflation air in the article. Threaded in the outer end of passage 14 may be removable cap 19, having a slotted head portion 20 of relatively small size adapted to be received within an opening 21 in the wall of the article. The cap 19 has a cylindrical aperture 23 therethrough of substantially the same diameter as the inner end portion 14a of passage 14, and aligned with the same, for somewhat loose sliding reception of air inflation needle of known type in which the injection needle is about one inch long by one-sixteenth inch in diameter.

The portion 14b of the passage 14, intermediate cap 19 and inner passage 14a, is of enlarged diameter equal to, or less in diameter, than the threaded portion of cap 19, to define a chamber in which is tightly received an elastic cylindrical body or insert 24. The elastic body has a cylindrical aperture 25 therethrough in alignment with aperture 23 in cap 19 and the inner passage 14a, said aperture 25 being of smaller diameter than the usual inflation needle so that such a needle may be manually inserted through passages 23, 25, and 14a for inflating the article, in which case the resultant tight, yieldingly compressive fit of the needle through the elastic body 24 will obviate escape of inflation air outwardly of the body.

The elastic sleeve 16 preferably is slightly shorter than the space between the end shoulders defined by the groove 15, to obviate any tendency for the tube to buckle and thereby minimize sealing contact with the smooth cylindrical surface of the groove.

In use of the improved valve 10 incorporated in a valve housing 12 of article 13, as best shown in FIGURE 3, inflation air from a suitable source is supplied through a conduit 27 and an inflation needle 28 attached thereto in known manner, the needle being injected through the cap 19, through the air-sealing elastic body 24, and projecting into the inner passage 14a substantially to the inner end thereof. Inflation air supplied through needle 28 passes through an outlet port 30 at the inner end of the needle, into the confined space between the needle and the wall portions of passage 14a, from which the air is forced through the opening 17 in the stem to expand the tubular sleeve 16. Expansion of the sleeve in turn allows the inflation air to enter the elastic article 13 to expand the same as necessary to accomplish full inflation thereof.

When the article is fully inflated, the inflation needle 28 is withdrawn from the valve. Upon termination of the supply of inflation air within the inner passage portion 14a, the elastic sleeve 16 immediately contracts about the cylindrical surface 15, again to seal the opening 17 against outward escape of air from the interior of the ball. Moreover, the internal pressure within the article tends to improve the sealing relationship of the sleeve 16 over the opening 17. In situations where an inflation needle 28 is not available, an inflation device including a threaded connector may be used temporarily to replace slotted cap 19, which is removable by use of a screw-driver.

FIGURE 5 shows a combination of an inflatable ball 13, generally as presented in FIGURES 1 to 4, and a modified form of valve unit 31 incorporated therein. Like parts, therefore, will be designated in the respective drawing views by like numerals, unless otherwise noted.

With particular reference to the valve unit 31, the rigid stem 32 thereof has an inflation needle passage 33 extending inwardly from its outer end to a depth short of the inner end of the stem as before. The outer end of the stem, however, has a bore 34 therein of greater diameter than the inner passage extent 35, defining a peripheral seat portion 36 in which a rubber-like elastic O-ring 37 is retained or confined by a rigid sleeve-like guide plug 38 tightly pressed or adhesively fitted within the bore 34, to have an integral flange 39 on the plug engaged with the outer end of the stem. The inner end of the plug 38 retains the O-ring 37 closely adjacent the seat 36, but the spacing may be such that upon resilient air-sealing projection of the inflation needle 28 through the O-ring, in either direction there can be a certain small degree of rolling movement of the O-ring, to enhance the air-sealing grip between the same and the inflation needle.

Integral extensions or irregularities 39 and 40 on the plug 38 and the outer end of stem 32, respectively, serve as protrusion means for anchoring the valve unit 31 to the valve housing molded about the valve unit as described in connection with FIGURES 1 and 2. Use and operation of the FIGURE 5 modification is otherwise the same as described above for FIGURES 1 to 4.

Referring now to FIGURES 6 to 8 in general and to FIGURE 6 in particular, there is illustrated a modified valve unit 41 designed to be operated in the manner shown in FIGURE 6, within a solid, centrally apertured protrusion 42 integrally cast with the wall 43 of the vinyl ball or other article 44, as by the method and means described in U.S. Patent No. 3,192,568, dated July 6, 1965.

As best shown in FIGURES 6 and 7, the improved valve unit 41 may include rigid, inwardly tapered, stem 45 having an inflation needle passage 46 extending inwardly from its outer end to adjacent the inner end of the stem, and communicates the inner extent 47 of the passage with an inlet orifice 48 of reduced diameter which opens to the interior of the article (FIGURE 6), at an inner tip end of the stem presented at the inner end of housing 42. As in the FIGURE 5 construction, the outer end of stem 45 has an enlarged bore 49 therein in which a rigid, sleeve-like guide plug 50 is adhesively or otherwise secured to retain or confine an inflation-needle sealing O-ring 51 closely adjacent an annular seat 52, as before. Integral flanges or protrusion means 53 and 54 on plug 50 and stem 45, respectively, anchoringly retain the valve unit 41 in the apertured housing 42 which is molded and contracted about the same, as shown in FIGURE 6.

In the FIGURES 6 to 8 form of the invention, however, the inner extent 47 of the passage 46 houses a spring-pressed detent, including a ball-bearing or other smooth surfaced body 55, which is normally yieldingly held in air-sealing relation to the inner side of O-ring 51, by a compression spring 56, extended between the body 55 and an annular shoulder 57 at the inner end of said inner passage extent 47.

The rigid valve unit of FIGURES 7 and 8 has advantages over other forms of the invention, in that it is completely self-contained and very compact, and less expensive to produce. Beceause of its compactness it is particularly suited for incorporation in the type of valve housing best shown in FIGURE 6. The FIGURE 7 form of valve structure, moreover, makes possible the practical application of the spring-pressed detent 55, which permits both inflation and deflation of the inflatable articles. Deflation of the article is accomplished either by insertion of an open or disconnected inflation needle, or of any slender pin, yieldingly to release the ball body 55 away from air-sealing engagement with the O-ring 51. Conversely, inflation air in the article tends to hold said ball body in air-sealing engagement with the O-ring.

The valve stem units of the various forms of the invention may be made of metal or other rigid material. It has been found, however, that the stem 41 and plug 50 of the valve unit of FIGURES 7 and 8 are particularly adapted for economical production from molded, rigid, or semi-rigid, synthetic resin plastics. Injection molded medium-impact polystyrene has been found highly satisfactory for the foregoing purposes in actual practice of the invention.

Other modifications of the invention may be resorted to without departing from the spirit thereof or the scope of the appended claims.

What is claimed is:

1. A valve as for an inflatable article of the type having a valve housing of elastic material in the wall thereof provided with a valve receiving aperture therethrough, comprising: a relatively rigid elongated stem having an outer end portion for anchoring reception in air-sealing relation within said valve housing aperture to present at least an inner end portion of the stem within the article; said stem having an inflation needle receiving passage extending inwardly from an outer end of the same to a substantial depth; resilient guide means affixed in said passage including a guide opening aligned with an inner extent of said passage for inward yielding, air-sealing projection of an air-inflation needle therethrough to present an air outlet port in the inner end of the needle within said inner passage extent; and closure means carried by said stem and operable when said inflation needle is in said air-sealing relation to said resilient guide means for passage of inflation medium between said inner passage extent and the interior of the inflatable article, the outer end of said stem having a bore therein of greater diameter than said inner passage extent to define a peripheral seat for said resilient guide means and a guide plug being affixed in said bore to retain said guide means adjacent said seat, and having a guide passage therein constituting an outer extent of said needle-receiving passage, said stem having irregular portions adjacent the outer end thereof adapted to be anchoringly embedded in the elastic material of the valve housing, said irregular portions including extension of the material of said guide plug.

2. A valve for an inflatable article having a valve housing in the wall thereof, comprising: a rigid elongated stem having an outer end portion attachable within the valve housing to present an inner end portion thereof freely within the article; said stem having a passage extending inwardly from an outer end of the same to a depth short of the inner end thereof; said inner end portion of the stem having an annular groove providing a reduced uniformly smooth surface of substantial length and a tubular elastic sleeve yieldingly expanded thereon in air-sealing relation over opening means from said passage to said groove; guide means at the outer end of said passage providing a guide aligned with an inner extent of said passage for reception of an air-inflation needle to have an air outlet port in the inner end of the needle within said inner passage extent; said guide means including a resilient air-sealing portion provided with an opening therethrough for air-sealing reception of the inserted inflation needle; whereby in use of the valve in an article said resilient portion will retain the inflation air within said inner passage extent except for discharge through said opening means past said sleeve, the outer end of said stem having a bore therein of greater diameter than said inner passage extent to define a peripheral seat for said resilient guide means; and a guide plug being affixed in said bore to retain said guide means adjacent said seat, and having a guide passage therein constituting an outer extent of said needle-receiving passage, said stem having thereon protrusion means adapted to be anchoringly embedded in the elastic material of the valve housing, said protrusion means including extended portions of said guide plug.

3. A valve as for an inflatable article of the type having a valve housing of elastic material in the wall thereof provided with a valve receiving aperture therethrough, comprising: a relatively rigid elongated stem having an outer end portion for anchoring reception in air-sealing relation within said valve housing aperture to present at least an inner end portion of the stem within the article; said stem having an inflation needle receiving passage extending inwardly from an outer end of the same to a substantial depth; resilient guide means affixed in said passage including a guide opening aligned with an inner extent of said passage for inward yielding, air-sealing projection of an air-inflation needle therethrough to present an air outlet port in the inner end of the needle within said inner passage extent; and closure means carried by said stem and operable when said inflation needle is in said air-sealing relation to said resilient guide means for passage of inflation medium between said inner passage extent and the interior of the inflatable article, the outer end of said stem having a bore therein of greater diameter than said inner passage extent to define an axially outwardly presented peripheral shoulder; and a guide plug being affixed in said bore to define peripheral seat means in which said resilient guide means is retained between said shoulder and the inner end of said guide plug; said guide plug having a guide passage therein constituting an outer extent of said needle-receiving passage, said stem having thereon means providing irregular portions adapted to be anchoringly embedded in the elastic material of the valve housing, said closure means including a spring-pressed body mounted within said inner passage extent, and normally yieldingly urged into air-sealing engagement with said resilient guide means, and inwardly engageable by a needle-like object projected into said inner passage extent for said passage of inflation medium, through an orifice in the inner end of said stem.

4. A valve as in claim 1, said closure means including an annular groove on said inner end portion of the stem providing a reduced uniformly smooth surface of substantial length, and a tubular elastic sleeve yieldingly expanded thereon in air-sealing relation over opening means from said passage to said annular groove.

5. A valve as in claim 3, said guide plug being in threaded connection with said stem.

6. A valve as in claim 3, said resilient guide means being a rubber-like elastic O-ring.

References Cited

UNITED STATES PATENTS

| | | | |
|---|---|---|---|
| 2,663,968 | 12/1953 | Longino | 46—90 X |
| 2,778,374 | 1/1957 | Boyer | 137—231 X |
| 3,065,763 | 11/1962 | Howard | 137—223 |
| 3,204,959 | 9/1965 | Nicholls | 137—223 X |
| 3,285,274 | 11/1966 | Bouvier | 137—320 X |
| 2,981,322 | 4/1961 | Schum | 251—149.6 X |
| 3,230,964 | 1/1966 | Debrotnic et al. | 251—149.6 X |

FOREIGN PATENTS

| | | |
|---|---|---|
| 398,349 | 1909 | France. |
| 646,450 | 1936 | Germany. |

WILLIAM F. O'DEA, *Primary Examiner.*

D. H. LAMBERT, *Assistant Examiner.*